United States Patent
Hiroe et al.

(10) Patent No.: US 11,293,305 B2
(45) Date of Patent: Apr. 5, 2022

(54) CONTROL DEVICE, GAS TURBINE, CONTROL METHOD, AND PROGRAM

(71) Applicant: Mitsubishi Hitachi Power Systems, Ltd., Kanagawa (JP)

(72) Inventors: Takaharu Hiroe, Tokyo (JP); Satoshi Hada, Yokohama (JP); Kazunari Ide, Tokyo (JP); Koki Tateishi, Tokyo (JP); Ryuji Takenaka, Yokohama (JP); Koshiro Fukumoto, Yokohama (JP); Shinichi Yoshioka, Yokohama (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 163 days.

(21) Appl. No.: 16/644,629

(22) PCT Filed: Sep. 12, 2018

(86) PCT No.: PCT/JP2018/033804
§ 371 (c)(1),
(2) Date: Mar. 5, 2020

(87) PCT Pub. No.: WO2019/065241
PCT Pub. Date: Apr. 4, 2019

(65) Prior Publication Data
US 2021/0062678 A1 Mar. 4, 2021

(30) Foreign Application Priority Data
Sep. 26, 2017 (JP) .............................. JP2017-184529

(51) Int. Cl.
*F01D 25/12* (2006.01)
*F01D 21/12* (2006.01)
*F02C 7/28* (2006.01)

(52) U.S. Cl.
CPC ............. *F01D 25/12* (2013.01); *F01D 21/12* (2013.01); *F02C 7/28* (2013.01); *F05D 2240/55* (2013.01);
(Continued)

(58) Field of Classification Search
CPC ............. F01D 25/12; F01D 21/12; F02C 7/28
See application file for complete search history.

(56) References Cited

U.S. PATENT DOCUMENTS

| 5,157,914 A | 10/1992 | Schwarz et al. |
| 7,908,840 B2 * | 3/2011 | Schwarz ................. F01D 25/18 60/39.08 |
| 2016/0326878 A1 | 11/2016 | Morimoto et al. |

FOREIGN PATENT DOCUMENTS

| JP | 05-171958 | 7/1993 |
| JP | 3100723 | 10/2000 |
| JP | 2015-145644 | 8/2015 |

OTHER PUBLICATIONS

International Search Report dated Nov. 27, 2018 in International (PCT) Patent Application No. PCT/JP2018/033804.
(Continued)

*Primary Examiner* — Michael L Sehn
(74) *Attorney, Agent, or Firm* — Wenderoth, Lind & Ponack, L.L.P.

(57) ABSTRACT

A control device is configured to control a temperature of a shaft seal portion around a rotating shaft of a rotating machine by adjusting an amount of cooling air to be supplied to the shaft seal portion. The control device is configured to calculate a sensitivity indicated using the temperature of the shaft seal portion with respect to a flow rate of the cooling air supplied to the shaft seal portion and control the flow rate of the cooling air so that the sensitivity has a predetermined target value based on the sensitivity which has been calculated. When the sensitivity is calculated, the flow rate is
(Continued)

varied in a predetermined range having a certain flow rate as a center. The sensitivity is calculated from variation in the temperature of the shaft seal portion with respect to variation in the flow rate.

13 Claims, 9 Drawing Sheets

(52) U.S. Cl.
CPC .... *F05D 2240/60* (2013.01); *F05D 2260/232* (2013.01); *F05D 2270/303* (2013.01)

(56) References Cited

OTHER PUBLICATIONS

Written Opinion of the International Searching Authority dated Nov. 27, 2018 in International (PCT) Patent Application No. PCT/JP2018/033804.

* cited by examiner

| OUTPUT VALUE | ATMOSPHERIC TEMPERATURE | ... | VALUE OF Asv |
|---|---|---|---|
| LESS THAN W1 | LESS THAN t1 | ... | X1 |
| LESS THAN W1 | t1~t2 | ... | X2 |
| ... | ... | ... | ... |
| W1~W2 | LESS THAN t1 | | X3 |
| W1~W2 | t1~t2 | | X4 |
| ... | ... | ... | ... |

CONTROL DEVICE, GAS TURBINE, CONTROL METHOD, AND PROGRAM

CROSS-REFERENCE TO RELATED APPLICATION

Priority is claimed from Japanese Patent Application No. 2017-184529, filed Sep. 26, 2017, the content of which is incorporated herein by reference.

TECHNICAL FIELD

The present invention relates to a control device, a gas turbine, a control method, and a program.

BACKGROUND ART

A plurality of stages of turbine blades are provided around a rotor of a turbine. In a casing of a turbine, a plurality of turbine vanes are arranged at positions on an upstream side from turbine blades of each stage. A temperature of a rotor is required to be managed so that the temperature of the rotor does not greatly exceed 400° C. due to metallic properties thereof. For this reason, semi-closed spaces called disk cavities are provided between turbine vanes on an upstream side and turbine blades on a downstream side and isolated from each other so that combustion gases do not come into contact with a rotor. A fluid such as cooling air extracted from a compressor is supplied to disk cavities to prevent a temperature of a rotor from rising.

Patent Literature 1 to 3 describe flow rate control of cooling air supplied to disk cavities. Patent Literature 1 includes a table in which a flow rate of cooling air is defined for each condition such as an output of a gas turbine and the outside air temperature and describes a control method for determining a degree of opening of a valve configured to adjust a flow rate of cooling air in accordance with settings of this table. Although the table has a setting in which excessive cooling air flows in consideration of safety, the use of excessive cooling air is not economical because high-pressure cooling air is wasted.

Patent Literature 2 describes a technology for performing feedback-controlling on a temperature of disk cavities. If a flow rate of cooling air is insufficient, this causes an increase in the temperature of disk cavities. Thus, it is possible to compensate for the variation in the temperature of the disk cavities through feedback-controlling. However, it is difficult to suitably maintain the temperature of the disk cavities, for example, in a transition period or the like at which an output of a gas turbine increases using only such control. Thus, Patent Literature 3 describes a control method for controlling a degree of opening of a valve by preparing a table having settings for a temperature of disk cavities corresponding to an operation state of a gas turbine, and when the gas turbine operates, changing a target temperature of the disk cavities in accordance with an operation state of the gas turbine at that time.

CITATION LIST

Patent Literature

[Patent Literature 1]
Japanese Patent No. 3100723
[Patent Literature 2]
Japanese Unexamined Patent Application, First Publication No. H5-171958
[Patent Literature 3]
Japanese Unexamined Patent Application, First Publication No. 2015-145644

SUMMARY OF INVENTION

Technical Problem

However, Patent Literature 1 to 3 do not describe a method for supplying only a necessary minimum amount of cooling air to disk cavities and maintaining a temperature of the disk cavities at an appropriate temperature.

The present invention provides a control device, a gas turbine, a control method, and a program capable of solving the above-described problems.

An aspect of the present invention is a control device configured to control a temperature of a shaft seal portion provided around a rotating shaft of a rotating machine, wherein a flow rate of cooling air is controlled so that a sensitivity indicated by a temperature of the shaft seal portion with respect to the flow rate of the cooling air supplied to the shaft seal portion is to be a predetermined target value.

According to an aspect of the present invention, a predetermined target value associated with the sensitivity is a value of the sensitivity with respect to the flow rate in which the temperature of the shaft seal portion is within an allowable range among sensitivities of a flow rate with respect to the flow rate within a predetermined range from a boundary between a flow rate of the cooling air at which an absolute value of the sensitivity is larger than 0 and a flow rate of the cooling air at which the absolute value of the sensitivity is 0.

According to an aspect of the present invention, the predetermined target value associated with the sensitivity is a value of the sensitivity at a flow rate smaller by a predetermined value than the flow rate at a boundary at which the absolute value of the sensitivity changes from a value larger than 0 to 0 with an increase in the flow rate by a predetermined value.

According to an aspect of the present invention, the control device controls the flow rate so that the sensitivity approaches the target value from a flow rate larger than the flow rate at the boundary to a smaller flow rate.

According to an aspect of the present invention, the control device controls a degree of opening of a flow rate control valve provided in a path through which the cooling air is supplied to the shaft seal portion to control a flow rate of the cooling air, and at the time of controlling the degree of opening of the flow rate control valve is controlled, varies an opening degree command value to the flow rate control valve within a predetermined range, calculates the sensitivity with respect to the flow rate at a degree of opening representing the varied opening degree command value on the basis of variation of the temperature of the shaft seal portion due to the variation, and corrects the opening degree command value to the flow rate control valve on the basis of a deviation between the calculated sensitivity and the target value.

According to an aspect of the present invention, when the sensitivity of the temperature of the shaft seal portion with respect to the flow rate of the cooling air is calculated, the control device calculates the sensitivity with respect to the flow rate based on the opening degree command value to the flow rate control valve and corrects the calculated sensitivity on the basis of a gap between the opening degree command value to the flow rate control valve and an actual flow rate of the cooling air based on the opening degree command value.

According to an aspect of the present invention, in a case in which the sensitivity varies in a state in which the deviation between the sensitivity and the target value is controlled such that it is within a predetermined allowable range, when the temperature of the shaft seal portion when the flow rate of the cooling air is small in the variation exceeds a predetermined allowable range, the control device reduces the target value so that the temperature of the shaft seal portion does not exceed a predetermined threshold value even if variation in the sensitivity occurs.

According to an aspect of the present invention, a different value is set as the target value in accordance with an operation state or an operation environment of the rotating machine.

According to an aspect of the present invention, when the flow rate of the cooling air flowing out of the shaft seal portion changes due to deformation due to thermal expansion of the shaft seal portion, the control device controls the flow rate of the cooling air so that the sensitivity is a target value set for the deformation.

According to an aspect of the present invention, the control device has the rotating machine as a gas turbine and the shaft seal portion as a disk cavity of a turbine included in the gas turbine.

An aspect of the present invention is a gas turbine including the control device.

An aspect of the present invention is a method for controlling a temperature of a shaft seal portion provided around a rotating shaft of a rotating machine, wherein a flow rate of cooling air supplied to the shaft seal portion is controlled so that a sensitivity indicated by a temperature of the shaft seal portion with respect to the flow rate of the cooling air supplied to the shaft seal portion is to be a predetermined target value.

An aspect of the present invention is a program causing a computer to function as: a means for determining a flow rate of cooling air supplied to a shaft seal portion provided around a rotating shaft of a rotating machine so that a sensitivity indicated by a temperature of the shaft seal portion with respect to the flow rate of the cooling air supplied to the shaft seal portion is to be a predetermined target value.

Advantageous Effects of Invention

According to the above-described control device, gas turbine, control method, and program, it is possible to maintain a temperature of disk cavities at an appropriate temperature while economizing on a flow rate of cooling air supplied to the disk cavities.

DESCRIPTION OF EMBODIMENTS

First Embodiment

A method for controlling cooling air supplied to a disk cavity according to an embodiment of the present invention will be described below with reference to FIGS. 1 to 5.

Figure 1:
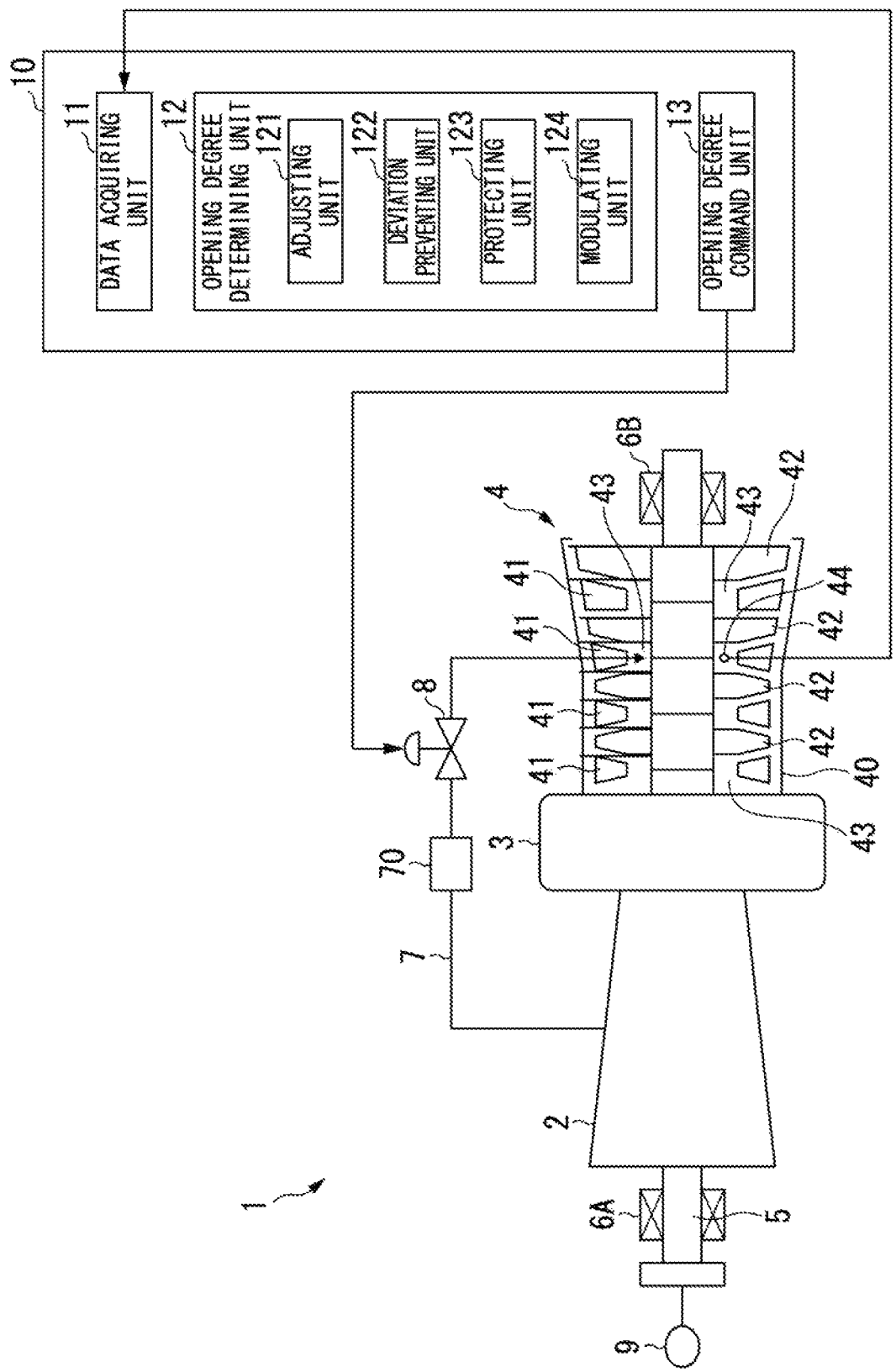
FIG. 1 is a system diagram of a gas turbine plant in a first embodiment of the present invention.

FIG. 1 is a system diagram of a gas turbine plant in the embodiment of the present invention.

As illustrated in FIG. 1, the gas turbine plant in this embodiment includes a gas turbine 1 and an electric power generator 9 configured to generate electric power through driving of the gas turbine 1. The gas turbine 1 and the electric power generator 9 are connected using the rotor 5. The gas turbine 1 includes a compressor 2 configured to compress air to generate compressed air, a combustor 3 configured to mix the compressed air with a fuel gas and combust the mixture to generate a high-temperature combustion gas, a turbine 4 driven using the combustion gas, and a control device 10. The rotor 5 is rotatably supported by bearings 6A and 6B. An extraction pipe 7 configured to guide air extracted from the middle of the compressor 2 toward the turbine 4 side is provided between the compressor 2 and the turbine 4 and a cooling device 70 configured to cool the extracted air and a cooling air flow rate control valve 8 configured to adjust a flow rate of cooling air flowing in toward the turbine 4 side are provided in the extraction pipe 7. The control device 10 controls a degree of opening of the cooling air flow rate control valve 8.

The turbine 4 rotates about the rotor 5. The turbine 4 includes a casing 40 configured to support the rotor 5, turbine vanes 41 protruding from the casing 40 toward the rotor 5, and turbine blades 42 protruding from the rotor 5 toward the casing 40. The casing 40 has a tubular shape in which the casing 40 covers the columnar rotor 5 from a side circumferentially outward therefrom.

The plurality of turbine vanes 41 are fixed to the casing 40, disposed to protrude inward in a radial direction of the rotor 5, and provided at intervals in an axial direction of the rotor 5. The plurality of turbine blades 42 are fixed to the rotor 5, disposed to protrude outward in the radial direction of the rotor 5, and provided at intervals in the axial direction. The turbine vanes 41 and the turbine blades 42 form a pair and constitute one "stage" and a number of stages of the turbine vanes 41 and the turbine blades 42 are provided in the turbine 4. The blades of each stage are constituted so that blade heights of the turbine vanes 41 and the turbine blades 42 increase in a direction in which the combustion gas supplied from the combustor 3 flows in the turbine 4 (a direction from the left side toward the right side on the paper surface). In each stage, an upstream side (a high-pressure side) is assumed to be an upper stage and a downstream side (a low-pressure side) is assumed to be a lower stage in accordance with a flow of the combustion gas. Annular semi-closed spaces, that is, disk cavities 43, centering on an axis of the rotor 5 are provided between distal end portions of the turbine vanes 41 and an outer circumferential portion of the rotor 5. Cooling air paths through which part of the cooling air extracted from the middle of the compressor 2 to cool the turbine vanes 41 and cooled by the cooling device 70 passes through the turbine vanes 41 in the radial direction are provided in the turbine vanes 41. Furthermore, a constitution is provided so that the cooling air which has passed through the path is supplied from a distal end of the path to the disk cavities 43. A temperature sensor 44 is provided in the disk cavities 43 and measures a temperature inside the disk cavities 43. Flows of the combustion gas and the cooling air in the disk cavities 43 will be described below with reference to FIG. 2.

Figure 2:
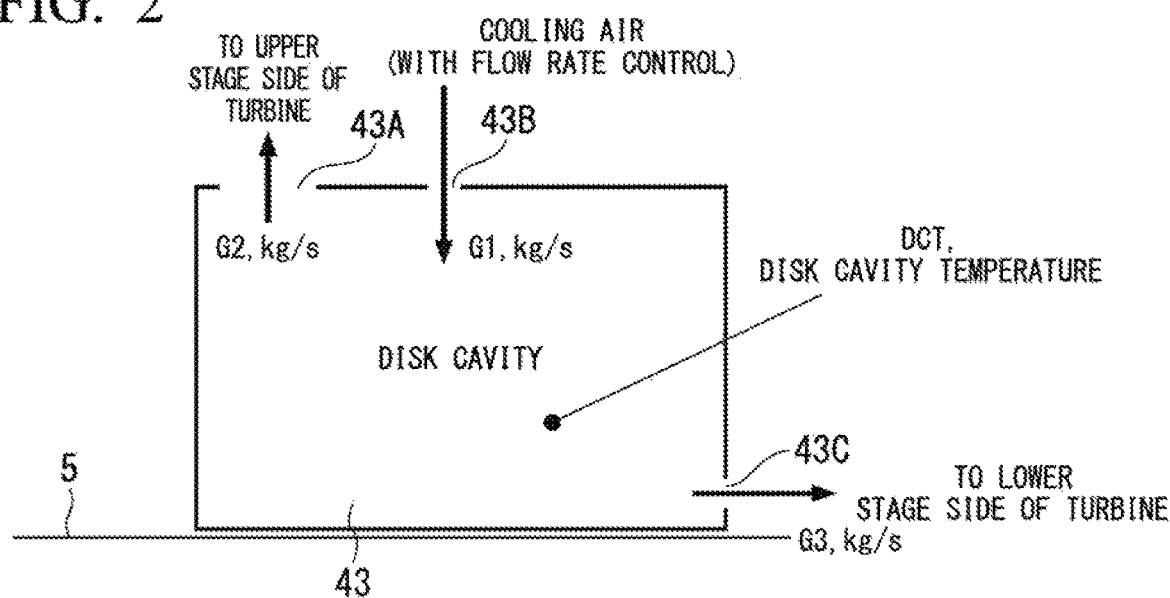
FIG. 2 is a diagram illustrating opening portions provided in a disk cavity in the first embodiment of the present invention.

FIG. 2 is a diagram illustrating opening portions provided in a disk cavity in the embodiment of the present invention.

FIG. 2 illustrates a schematic diagram of the disk cavity when viewed from a gaze direction in FIG. 1. As illustrated in FIG. 2, an opening portion 43A and an opening portion 43B which is opening for cooling air supplied from the turbine vanes 41 are provided on an outer side of a disk cavity 43 in the radial direction thereof. An opening portion 43C is provided on a lower stage side of the disk cavity 43 in the radial direction thereof (a side thereof in contact with the rotor 5). An area of the opening portion 43A is large and an area of the opening portion 43C is small. Here, assuming that there is no inflow of cooling air G1 from the opening portion 43B, the combustion gas flows from a higher-pressure upper stage side toward a lower-pressure lower stage side. Thus, a flow in which the combustion gas flows in through the opening portion 43A, the disk cavity 43 is filled with the combustion gas, and the combustion gas flows out through the opening portion 43C occurs. If such a flow occurs, a temperature inside the disk cavity 43 increases and a temperature of the rotor 5 in contact with the disk cavity 43 also increases due to such an influence. The temperature of the rotor 5 made of a metal needs to be maintained at a predetermined temperature (for example, about 420° C.) or lower. For this reason, the cooling air which has passed through the turbine vanes 41 is taken in from the opening portion 43B and control is performed such that the inside of the disk cavity 43 has the above-described predetermined temperature. To be more specific, the control device 10 adjusts the degree of opening of the cooling air flow rate control valve 8 and adjusts a flow rate of cooling air supplied from the extraction pipe 7 toward the turbine vanes 41 side. That is to say, the control device 10 controls a flow rate of the cooling air G1 supplied from the opening portion 43B to the disk cavity 43. If the flow rate G1 of the cooling air increases, the combustion gas flowing into the disk cavity 43 decreases and thus the cooling air flows out toward an upper stage side of a combustion gas path through the opening portion 43A. Hereinafter, a flow from the disk cavity 43 toward the upper stage side of the combustion gas path via the opening portion 43A (a direction indicated by an arrow together with a flow rate G2) is referred to as a "forward flow" and a flow from the combustion gas path to the disk cavity 43 via the opening portion 43A is referred to as a "backflow." A direction in which the cooling air flows through the opening portion 43B is always a direction indicated by an arrow (an inflow direction to the disk cavity 43) together with the flow rate G1. The cooling air and the combustion gas with respect to the opening portion 43C always flow in a direction indicated by an arrow (an outflow direction from the disk cavity 43) together with a flow rate G3.

Figure 3:
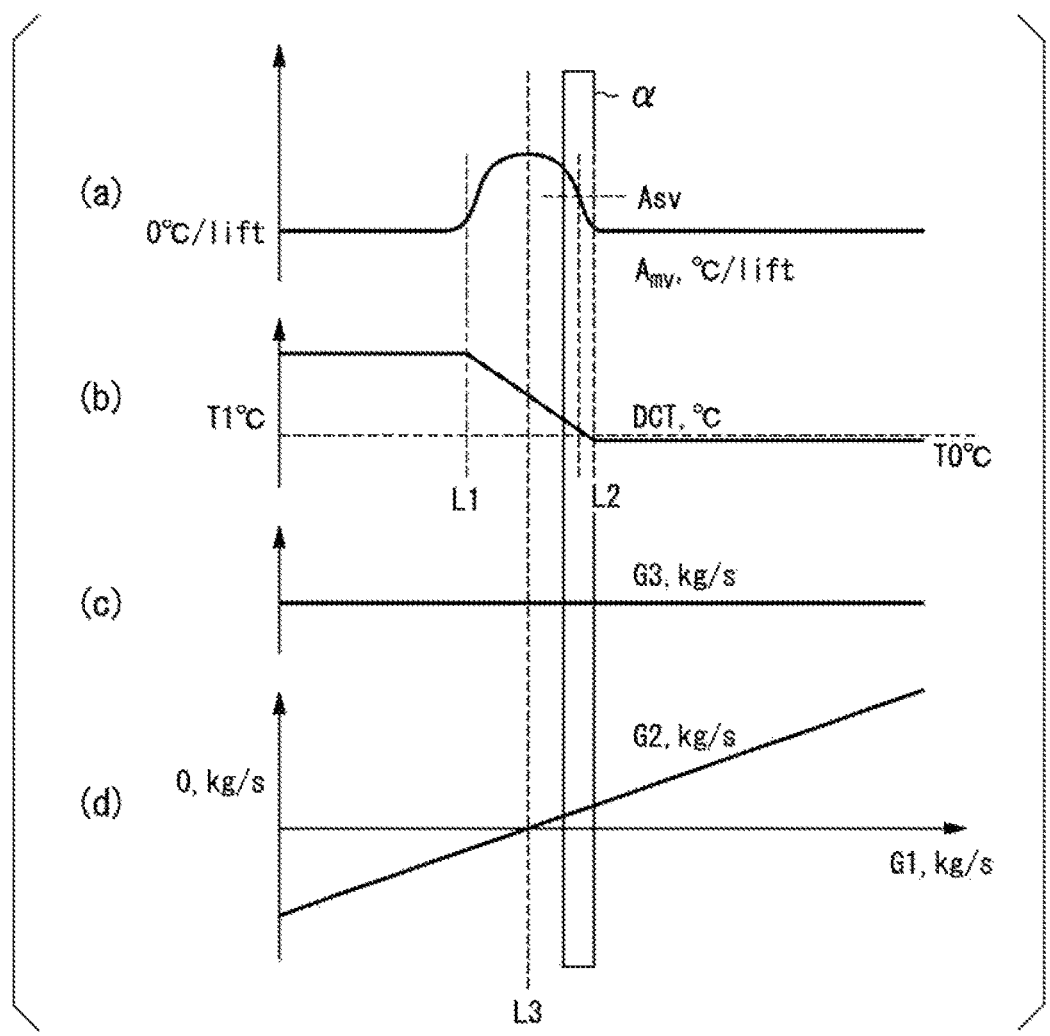
FIG. 3 is a diagram illustrating a relationship between a flow rate of cooling air flowing through the disk cavity and a temperature of the disk cavity in the first embodiment of the present invention.

A relationship between the flow rates G1 to G3 and a temperature of the disk cavity 43 will be described below with reference to FIG. 3. FIG. 3 is a diagram explaining a relationship between a flow rate of cooling air flowing through a disk cavity and a temperature of a disk cavity in the embodiment of the present invention.

(a) of FIG. 3 illustrates a graph of a sensitivity of a temperature of the disk cavity 43. (b) of FIG. 3 illustrates a graph of a temperature of the disk cavity 43 provided at a certain stage, (c) of FIG. 3 illustrates a graph of a flow rate G3 of cooling air or a combustion gas flowing out through the opening portion 43C, and (d) of FIG. 3 illustrates a graph of a flow rate G2 of cooling air or a combustion gas going in and out through the opening portion 43A. A horizontal axis of each graph indicates a magnitude of a flow rate G1 of cooling air from the opening portion 43B to the disk cavity 43 and the same position on the horizontal axis of each graph is the same flow rate.

First, reference is made to the graph of c of FIG. 3. A magnitude of the flow rate G3 in (c) of FIG. 3 is illustrated. From a size relationship between the opening portion 43A and the opening portion 43C, the flow rate G3 of cooling air or the like flowing from the disk cavity 43 toward a lower stage side is governed by a differential pressure between before and after the opening portion 43C and substantially constant regardless of the magnitude of the flow rate G1.

Subsequently, reference is made to the graph of (d) of FIG. 3. A magnitude of the flow rate G2 in (d) of FIG. 3 is illustrated. The flow rate G2 is a value obtained by subtracting the flow rate G3 from the flow rate G1. As the flow rate G1 increases, a flow of a gas or the like flowing backward changes to a forward flow in the vicinity of a value of the flow rate G1 reaching L3. In addition, after that, the flow rate G2 of the forward flow increases with an increase in the flow rate G1. As described above, in order to make a temperature of the disk cavity 43 (DCT) have a temperature close to a temperature T1 illustrated in (b) of FIG. 3, it is necessary to make a flow of the opening portion 43A flow forward. Therefore, the control device 10 controls a degree of opening of the cooling air flow rate control valve 8 so that the flow rate G1 is equal to or larger than L3.

Subsequently, reference is made to the graph in (b) of FIG. 3. A vertical axis of (b) of FIG. 3 illustrates a temperature. When the flow rate G1 of the cooling air is small (less than L1), the temperature of the disk cavity 43 (DCT) is far higher than the target temperature T (for example, 420° C.). When the flow rate G1 is equal to or larger than L1 and less than L2, the DCT gradually decreases, and when the flow rate G1 is equal to or larger than L2, the DCT settles at a certain temperature T0 (for example, 380° C.). As described above, an increase in DCT leads to an excessive rise in temperature of the rotor 5. If the flow rate G1 is too large, an excessive amount of cooling air is supplied, which is not economical. Thus, in this embodiment, the DCT is maintained around a predetermined temperature T1. That is to say, the control device 10 controls the degree of opening of the cooling air flow rate control valve 8 so that the flow rate G1 has a value slightly smaller than L2.

Subsequently, reference is made to the graph in (a) of FIG. 3. (a) of FIG. 3 illustrates a relationship between the flow rate G1 and a sensitivity of the DCT. The sensitivity is a magnitude of a response of the DCT when a stimulus is applied to the flow rate G1. The applying of the stimulus means changing the flow rate G1 in a predetermined range centering on a certain value. Thus, a response indicating that the DCT variously changes or hardly changes in response to the variation in the flow rate is illustrated. In this embodiment, the flow rate G1 is varied by varying the degree of opening of the cooling air flow rate control valve 8 and a magnitude (a sensitivity) of the response is calculated. A method for calculating the sensitivity will be described later. The calculated sensitivity is referred to as a sensitivity to a value of the flow rate G1 which is a center of the variation. The vertical axis in (a) of FIG. 3 indicates a magnitude (an absolute value) of a sensitivity. For example, when the flow rate G1 of the cooling air is less than L1 or more than L2, the DCT is constant. That is to say, when the flow rate G1 is within this range, there is no change in DCT even if a stimulus is applied to the flow rate G1 (there is no sensitivity). On the other hand, when the flow rate G1 is equal to or larger than L1 and less than L2, a change has occurred in the DCT (there is a sensitivity). Referring to (a) and (b) of FIG. 3, as the flow rate G1 increases, if the DCT exceeds a range in which there is a sensitivity (L1 to L2), the DCT is settled at a certain temperature T0. As described above, in order to economize on an amount of cooling air to be supplied, a goal is to perform control so that minimum required cooling air in which a predetermined temperature T1 can be maintained can be supplied. A band α in (a) of FIG. 3 is set in the vicinity of a right end in a range in which the DCT has a sensitivity (in the vicinity of an upper limit of the flow rate G1 in this range). If the value of the flow rate G1 can be controlled such that it has a value in the vicinity of the right end of the band α and slightly smaller than a boundary in which a sensitivity is zero (in view of economizing on cooling air), control can be performed so that an amount of cooling air is economized while the DCT is maintained in the vicinity of an appropriate temperature T1. Thus, the control device 10 in this embodiment detects the vicinity of the right end of the band α and controls the degree of opening of the cooling air flow rate control valve 8 in accordance with the detected value. A sensitivity at the flow rate G1 of the cooling air at which the temperature T1 is able to be realized is defined as a target sensitivity Asv and the control device 10 controls the flow rate G1 based on a sensitivity having the Asv as a target. The target sensitivity Asv is equivalent to a sensitivity of a portion slightly further to the left side of the band α than the right end thereof (a sensitivity at the flow rate G1 which is a predetermined value smaller than a flow rate at a boundary in which an absolute value of a sensitivity changes from a value larger than 0 to 0). Furthermore, the target sensitivity Asv is a sensitivity for a flow rate G1 in a predetermined range (smaller by a predetermined value) from the flow rate G1 (L2) at which the DCT falls within an allowable range between boundaries (L1 and L2) of the flow rate G1 between a flow rate G1 in which an absolute value of a sensitivity is a value larger than 0 and a flow rate G1 in which an absolute value of a sensitivity is 0.

FIG. 1 illustrates functions of the control device 10. The control device 10 includes a data acquiring unit 11, an opening degree determining unit 12, and an opening degree command unit 13. The control device 10 is constituted of, for example, one or more computers.

The data acquiring unit 11 acquires a value of the DCT measured by the temperature sensor 44, an output value of the gas turbine 1, and the like.

The opening degree determining unit 12 determines the degree of opening of the cooling air flow rate control valve 8 in which the flow rate G1 has a value in the vicinity of the right end of the band α described with reference to FIG. 3. The opening degree determining unit 12 includes an adjusting unit 121, a deviation preventing unit 122, a protecting unit 123, and a modulating unit 124. The adjusting unit 121 calculates an amount of correction in which the degree of opening of the cooling air flow rate control valve 8 is adjusted to a degree of opening in which the flow rate G1 is a flow rate corresponding to the target sensitivity Asv. The deviation preventing unit 122 prevents the flow rate G1 from largely deviating to a left side of the band α. The protecting unit 123 corrects the degree of opening in which the flow rate G1 has a value on the right side of the band α when the flow rate G1 largely deviates to the left side of the band α. For example, in such a case, the protecting unit 123 corrects the degree of opening of the cooling air flow rate control valve 8 so that the degree of opening of the cooling air flow rate control valve 8 is 100% (in a fully opened state). The modulating unit 124 varies the degree of opening of the cooling air flow rate control valve 8 centering on a certain value in a predetermined range and applies a stimulus to the degree of opening so that the adjusting unit 121 can calculate an amount of correction of a degree of opening. The adjusting unit 121 calculates a sensitivity of the DCT to the degree of opening which is the center of the variation from the response of the DCT to the stimulus and calculates an amount of correction on the basis of a deviation between the calculated sensitivity and the target sensitivity Asv.

The opening degree command unit 13 controls the degree of opening of the cooling air flow rate control valve 8 to a degree of opening determined by the opening degree determining unit 12.

The opening degree determining unit 12 will be described in more detail below with reference to FIG. 4.

Figure 4:
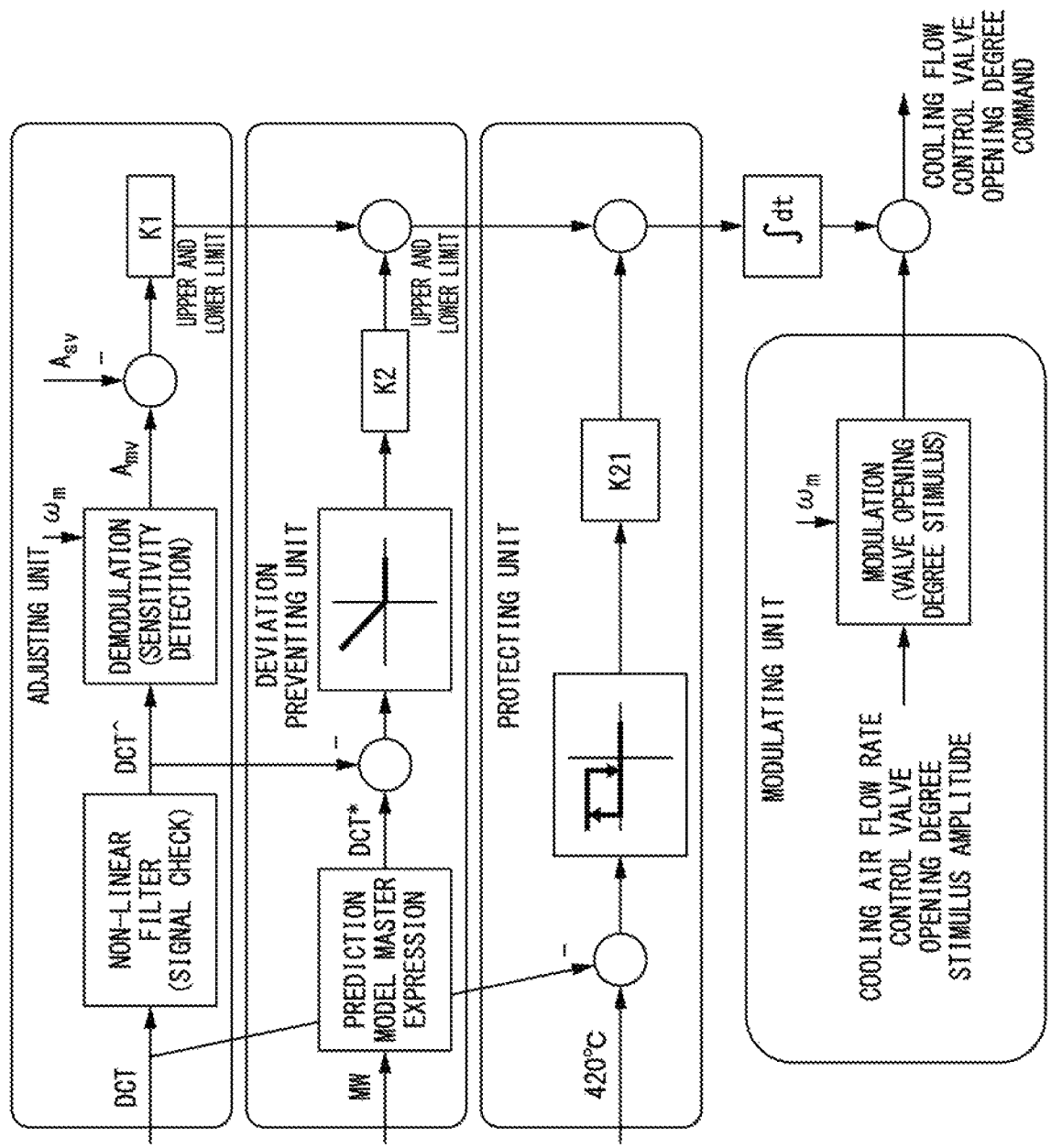
FIG. 4 is a diagram explaining a method for controlling a degree of opening of a valve according to the first embodiment of the present invention.

FIG. 4 is a diagram explaining a method for controlling a degree of opening of a valve according to the embodiment of the present invention.

The modulating unit 124 instructs the opening degree command unit 13 to output an opening degree command in which the degree of opening of the cooling air flow rate control valve 8 varies by, for example, an amplitude of 2% and a period of ωin are changed in a sine wave for 1 minute. The opening degree command unit 13 causes the degree of opening of the cooling air flow rate control valve 8 to be opened and closed by only an amount corresponding to 2% and varies the flow rate G1 in a one-minute cycle in accordance with this instruction. Before the valve opening degree control in this embodiment, the degree of opening of the cooling air flow rate control valve 8 is controlled to a predetermined degree of opening β set so that the flow rate G1 has a value on the right side of the right end of the band α. At the degree of opening β, the value of the flow rate G1 is sufficiently large and the DCT has the temperature T0. The degree of opening β is not necessarily a degree of opening of a valve in which a value of an economical flow rate G1 (without waste) is realized. Thus, in this embodiment, the modulating unit 124 modulates the degree of opening of the cooling air flow rate control valve 8 (varies the degree of opening at a predetermined frequency) and varies the flow rate G1 and the DCT. Moreover, the adjusting unit 121 monitors the variation (the sensitivity) in the DCT and detects the actual vicinity of the right end of the band α in the gas turbine in operation on the basis of the variation in the DCT. To be specific, the adjusting unit 121 acquires a value of the DCT when the modulating unit 124 varies the degree of opening of the cooling air flow rate control valve 8 via the data acquiring unit 11. The adjusting unit 121 removes noise by applying a non-linear filter to waveform data of the DCT. Subsequently, a demodulation function (a demodulation unit) included in the adjusting unit 121 selectively takes out a component (a sensitivity Amv) excited due to the variation of the degree of opening of the valve using the modulating unit 124 from waveform data of the DCT which has been subjected to noise removal using a Fourier transform or the like. In order to selectively take out the waveform data of the sensitivity Amv, the adjusting unit 121 performs a definite integral calculation using the following Expression to calculate a Fourier coefficient.

[Math. 1]

$$a = \frac{2}{60} \int_{t-60}^{t} \dot{T}_{DC} \times \sin\frac{2\pi}{60} t \, dt \qquad (1)$$
$$b = \frac{2}{60} \int_{t-60}^{t} \dot{T}_{DC} \times \cos\frac{2\pi}{60} t \, dt$$

Here, a numerical value 60 is a period of ωm (60 sec) and a TDC is a value of the DCT acquired by the data acquiring unit 11. Thus, Amv can be represented by the following Expression (2). The Amv is a sensitivity to the value of the flow rate G1 at a representative degree of opening (a degree of opening at a center of an amplitude) of the degree of opening modulated by the modulating unit 124.

[Math. 2]

$$Amv = \frac{60}{2\pi} \sqrt{a^2 + b^2} \qquad (2)$$

Subsequently, the adjusting unit 121 calculates an amount of correction of the cooling air flow rate control valve 8 on the basis of a deviation between the sensitivity Amv and the target sensitivity Asv and an adjustment coefficient K1. For example, if Amv is smaller than Asv, the adjusting unit 121 corrects the sensitivity Amv so that the sensitivity Amv is slightly larger, that is, the flow rate G1 decreases. On the other hand, if Amv is larger than Asv, if the flow rate G1 further decreases, a temperature of the DCT sharply rises. Thus, the adjusting unit 121 corrects Amv so that Amv decreases, that is, the flow rate G1 increases.

The deviation preventing unit 122 acquires an output value (MW) of the gas turbine 1 and calculates an upper limit value of the DCT according to the acquired output value using a prediction model or the like. Furthermore, if a temperature (a DCT) measured by the temperature sensor 44 is likely to exceed the upper limit value of the DCT, the deviation preventing unit 122 increases the degree of opening of the cooling air flow rate control valve 8. A coefficient K2 is an adjustment coefficient for the amount of correction of the cooling air flow rate control valve 8.

The protecting unit 123 monitors the temperature (the DCT) measured by the temperature sensor 44 and correction is performed so that the cooling air flow rate control valve 8 fully opens in place of the deviation preventing unit 122 if a measured value of the DCT is higher than a predetermined threshold value (for example, 420° C.). A coefficient K21 is an adjustment coefficient for the amount of correction of the cooling air flow rate control valve 8.

The opening degree determining unit 12 integrates values of amounts of correction calculated by the adjusting unit 121, the deviation preventing unit 122, and the protecting unit 123 in accordance with the variation of the DCT changing over time, adds the integrated value to a modulation command value of a degree of opening using the modulating unit 124, and determines the degree of opening of the cooling air flow rate control valve 8. The opening degree command unit 13 controls the degree of opening of the cooling air flow rate control valve 8 so that the degree of opening of the cooling air flow rate control valve 8 has a value determined by the opening degree determining unit 12. The opening degree determining unit 12 calculates Amv again on the basis of the DCT acquired by the data acquiring unit 11 and the output value of the gas turbine 1 and performs feedback-controlling so that the calculated Amv is equal to the target sensitivity Asv.

Generally, the DCT may be performed using a method or the like for performing feedback-controlling on the basis of a deviation between the temperature measured by the temperature sensor 44 and a target temperature in many cases. However, the target temperature may not be always optimal due to an operation state and an operation environment of the gas turbine. In this embodiment, instead of using a temperature of the DCT directly as a control mark, the sensitivity Amv of the DCT with respect to the flow rate G1 is monitored and the flow rate is controlled using a boundary at which an absolute value of Amv changes from a value larger than 0 to 0 as a mark. This is based on the fact that, when the flow rate G1 indicated by the boundary is larger than the flow rate when the flow rate G2 transitions from the backflow to the forward flow and thus is a flow rate in which a rapid increase in temperature of the DCT can be minimized and an excessive flow rate of the cooling air is likely to occur at a flow rate at which the absolute value of Amv is 0, if the flow rate G1 can be reduced slightly to an extent that the DCT does not rise more than the flow rate indicated by the boundary, an amount of cooling air to be supplied can be economized while the DCT is maintained at an appropriate temperature. If a sensitivity of the DCT having such properties has the same properties regardless of the operation state and the operation environment of the gas turbine 1, it is possible to expect not only optimization of the amount of cooling air to be supplied but also improvement of the control accuracy.

Here, although the description has been provided focusing on the function of calculating the degree of opening Which is the sensitivity Asv by applying the stimulus to the degree of opening of the valve which is a feature of this embodiment, the opening degree-determining unit 12 has a function of determining the degree of opening (a preceding degree of opening) of the cooling air flow rate control valve 8 in accordance with an output value or the like of the gas turbine 1, a function of correcting the degree of opening of the cooling air flow rate control valve 8 using feedback-controlling such as PI control based on a target value of the DCT and a measured value of the DCT, and the like.

The flow of the process of controlling the degree of opening of the cooling air flow rate control valve 8 in this embodiment will be described below.

Figure 5:
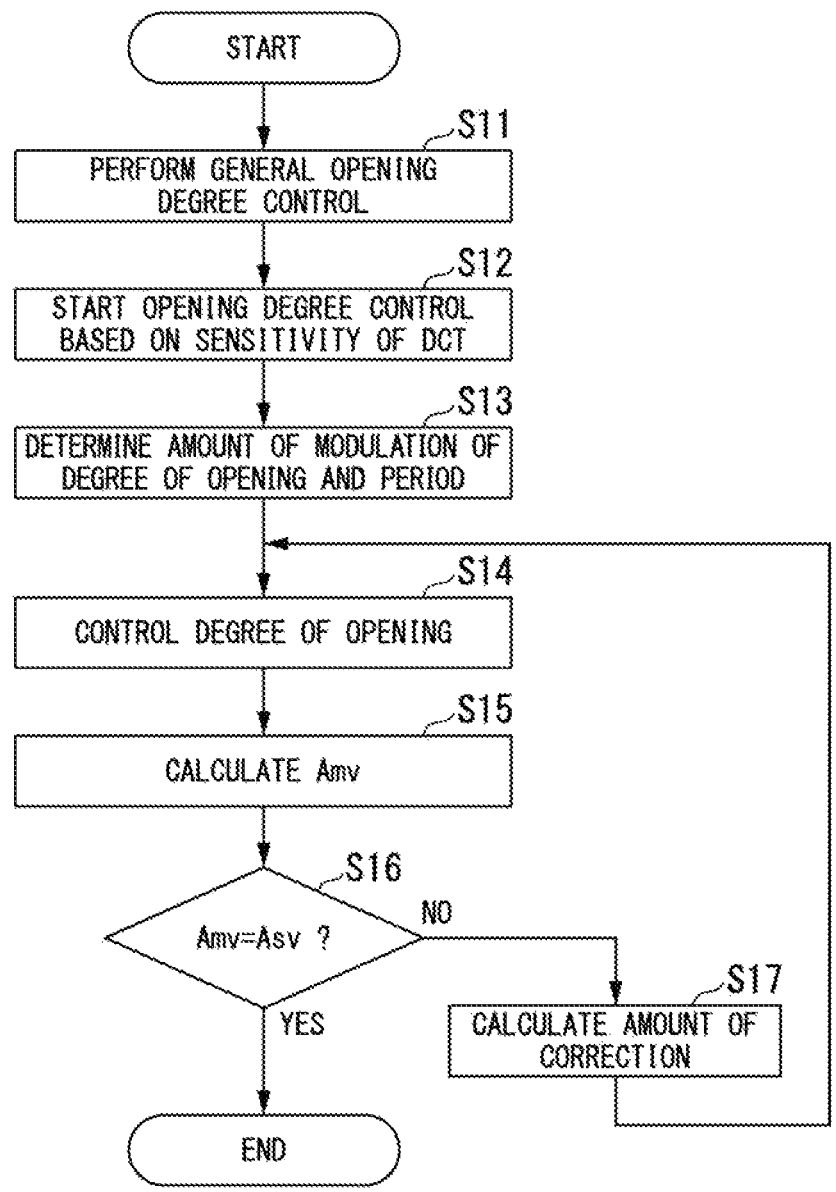
FIG. 5 is a flowchart describing an example of the method for controlling a degree of opening of a valve according to the first embodiment of the present invention.

FIG. 5 is a flowchart describing an example of the method for controlling a degree of opening of a valve according to the embodiment of the present invention.

First, the control device 10 performs general opening degree control of the cooling air flow rate control valve 8 (Step S11). In the general opening degree control, for example, the opening degree determining unit 12 adds an amount of correction in which the measured value of the DCT acquired by the data acquiring unit 11 approaches the target temperature of the DCT to the degree of opening of a valve of the cooling air flow rate control valve 8 according to an output value or the like of the gas turbine 1 and determines the degree of opening. Furthermore, the opening degree command unit 13 performs control so that the degree of opening of the cooling air flow rate control valve 8 is the degree of opening determined by the opening degree determining unit 12. That is to say, the opening degree determining unit 12 performs feedback-controlling based on the temperature of the disk cavity 43 to determine the degree of opening (the degree of opening β described with reference to FIG. 4) of the cooling air flow rate control valve 8. In the case of such control, the flow rate G1 of the cooling air is likely to be excessive. The data acquiring unit 11 keeps acquiring the DCT measured by the temperature sensor 44 and the output value of the gas turbine 1 at predetermined time intervals.

Subsequently, opening degree control based on the sensitivity of the DCT in this embodiment starts on the basis of an instruction or the like from a user (Step S12). First, the modulating unit 124 in the opening degree determining unit 12 determines an amount of modulation of a degree of opening and a period thereof (Step S13). When an amplitude of an amount of variation of the degree of opening is ±2% and a period is 1 minute, for example, the first 30 seconds means that the degree of opening increases by 2% from the original degree of opening and the next 30 seconds means that the degree of opening decreases by 2% from the original degree of opening. The opening degree determining unit 12 outputs the amount of modulation (a period and an amplitude) to the opening degree command unit 13. The opening degree command unit 13 controls the degree of opening of the cooling air flow rate control valve 8 (Step S14). To be specific, the degree of opening of the cooling air flow rate control valve 8 varies at the amount of modulation and the period determined by the modulating unit 124. The data acquiring unit 11 continuously keeps acquiring a value or the like of the DCT resulting from the variation in degree of opening of a valve.

Subsequently, the adjusting unit 121 calculates Amv (Step S15). The adjusting unit 121 extracts the influence of the modulation of the degree of opening of the cooling air flow rate control valve 8 from the measured value of the DCT using a Fourier transform and calculates a sensitivity Amv of the DCT with respect to the flow rate G1 at a center degree of opening (an opening degree command value) of the degree of opening in a certain range which is varied using the modulating unit 124 using Expressions (1) and (2).

Subsequently, the adjusting unit 121 compares Amv with Asv (Step S16). When Amv is equal to Asv (or when a difference between Amv and Asv is within an allowable range) (Step S16; Yes), the flow rate G1 is a target flow rate. Thus, there is no need to correct the degree of opening of the cooling air flow rate control valve 8. Therefore, this control ends.

When Amv is not equal to Asv (or when a difference between Amv and Asv is not within an allowable range) (Step S16; No), the adjusting unit 121 calculates an amount of correction and the deviation preventing unit 122 or the protecting unit 123 calculates an amount of correction (Step S17). To be specific, in the case of Amv>Asv, the adjusting unit 121 corrects the degree of opening of the cooling air flow rate control valve 8 so that the degree of opening of the cooling air flow rate control valve 8 increases. In the case of Amv<Asv, the adjusting unit 121 corrects the degree of opening so that the degree of opening decreases. When an amount of correction is calculated, for example, a function or the like in which Amv and Asv are input and an adjustment coefficient K1 is output is determined in advance and the adjusting unit 121 adjusts the amount of correction using this function or the like.

If a difference between the measured value of the DCT and an upper limit value of the DCT based on an output value of the gas turbine 1 is equal to or smaller than a predetermined value, the deviation preventing unit 122 corrects the degree of opening of the cooling air flow rate control valve 8 so that the degree of opening of the cooling air flow rate control valve 8 increases. When the measured value of the DCT has reached the upper limit value of the DCT, the protecting unit 123 corrects the degree of opening of the cooling air flow rate control valve 8 so that the degree of opening of the cooling air flow rate control valve 8 is in a fully open state.

The opening degree determining unit 12 determines the degree of opening of the cooling air flow rate control valve 8 by adding a value corresponding to an amount of modulation determined by the modulating unit 124 to a value obtained by adding an amount of correction calculated by the adjusting unit 121, the deviation preventing unit 122, and the protecting unit 123 and integrating the amount of correction.

Also, the process of Step S14 and the process subsequent to Step S14 are repeatedly performed.

According to this embodiment, the degree of opening of the cooling air flow rate control valve 8 is varied, a sensitivity Amv of the DCT with respect to the variation is calculated, and the flow rate G1 of the cooling air is corrected on the basis of a deviation between the target sensitivities Asv and Amv. Thus, it is possible to acquire the degree of opening of the cooling air flow rate control valve 8 in which the flow rate G1 of the cooling air is economized while the DCT is maintained at an appropriate temperature.

Second Embodiment

Valve opening degree control according to a second embodiment of the present invention will be described below with reference to FIG. 6. In the second embodiment, a sensitivity Amv is corrected on the basis of an actual degree of opening of the cooling air flow rate control valve 8 or an actual flow rate of the cooling air measured by an opening degree meter or a flow rate meter instead of the flow rate G1 based on an opening degree command value for the cooling air flow rate control valve 8. A case in which an opening degree meter is provided in the cooling air flow rate control valve 8 will be described below as an example.

Figure 6:
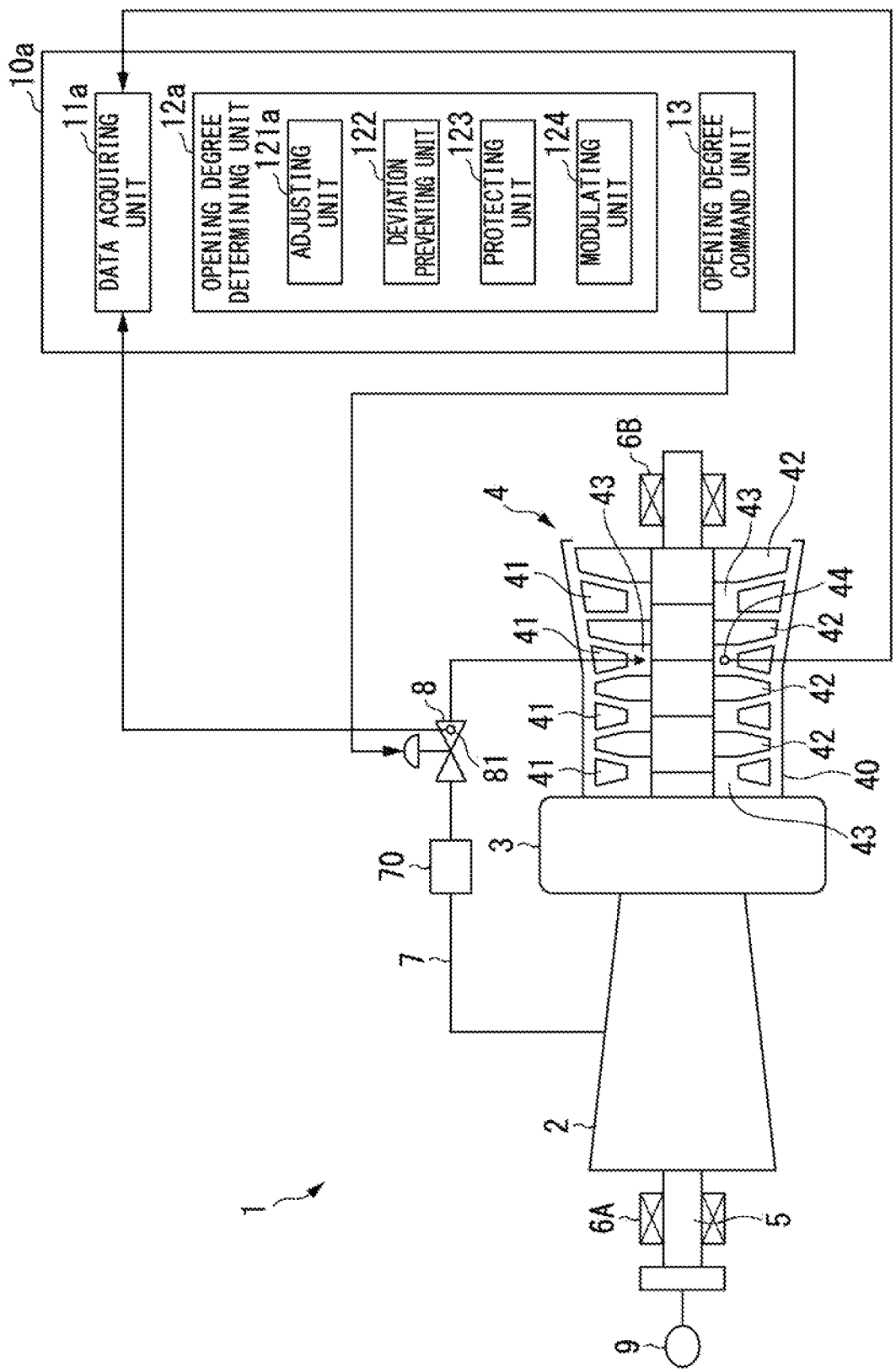
FIG. 6 is a system diagram of a gas turbine plant in a second embodiment of the present invention.

FIG. 6 is a system diagram of a gas turbine plant in the second embodiment of the present invention.

An opening degree meter 81 is provided in the cooling air flow rate control valve 8 in the extraction pipe 7. A data acquiring unit 11a in a control device 10a according to the second embodiment acquires a degree of opening of a cooling air flow rate control valve 8 measured by the opening degree meter 81 in addition to a measured value of a DCT and an output value of a gas turbine 1. An adjusting unit 121a in an opening degree determining unit 12a corrects the sensitivity Amv using the method described in the first embodiment on the basis of a gap between an opening degree command value for the cooling air flow rate control valve 8 and an actual degree of opening for a command value. Here, a sensitivity of the cooling air flow rate control valve 8 which is a reference is assumed to be Avlv0. The sensitivity which is a reference is, for example, a sensitivity when an actual response with respect to an opening degree command value of 1% is 1%. Subsequently, the adjusting unit 121a calculates a sensitivity Amv. At this time, a sensitivity of an actual degree of opening measured by the opening degree meter 81 when an opening degree command value based on an amount of correction determined by the adjusting unit 121a is output to the cooling air flow rate control valve 8 is assumed to be Avlv. Thus, the adjusting unit 121a corrects the calculated Amv using the following Expression (3):

$$Amvc = Amv \times (Avlv0 \div Avlv) \quad (3).$$

Amvc is a value of the sensitivity Amv which has been subjected to the correction. For example, assuming that only 0.5% responds to the opening degree command value of 1%, it is thought that a flow rate G1 of an actual cooling air is also about half a flow rate. The control method in the first embodiment includes calculating the sensitivity Amv on the assumption that a flow rate G1 corresponding to an opening degree command value is supplied to a disk cavity 43 without considering an actual flow rate. Since the sensitivity Amv corresponds to an amount of variation (an amplitude) of the flow rate G1, when the actual degree of opening is about half as in the above example, the actual sensitivity Amv is thought to be a nearly double value. Assuming that a value of Amv is double, referring to the graph illustrated in FIG. 3, actually, a sensitivity at a position at which the sensitivity is shifted to a left side significantly from the vicinity of a right end of a target band α is obtained and this deviates from target valve opening degree control. On the other hand, in this embodiment, it is possible to obtain an accurate Amvc obtained by correcting the value of Amv to a double value using the foregoing Expression (3). Thus, it is possible to adjust the degree of opening of the cooling air flow rate control valve 8 on the basis of a deviation between the accurate sensitivity Amvc and the target sensitivity Asv. For example, in the above example, although a degree of opening at which the sensitivity Amv is in the vicinity of the right end of the band α is attempted to be obtained by modulating the opening degree command value from a degree of opening at which the value of the flow rate G1 is sufficiently large, according to the method in the first embodiment, since control is performed using an apparent sensitivity Amv (based on the opening degree command value), there is a concern of an actual sensitivity passing through the band α and passing toward a left side. On the other hand, according to the control method in this embodiment, since the sensitivity Amvc of the accurate MI can be calculated through Expression (3), it is possible to prevent the above risks. A flow rate meter may be provided downstream of the cooling air flow rate control valve 8 instead of an opening degree meter and the same correction may be performed on the basis of the flow rate of the actual cooling air measured by the flow rate meter with respect to the opening degree command value.

Third Embodiment

Valve opening degree control according to a third embodiment of the present invention will be described below with reference to FIG. 7.

Figures 7, 8:
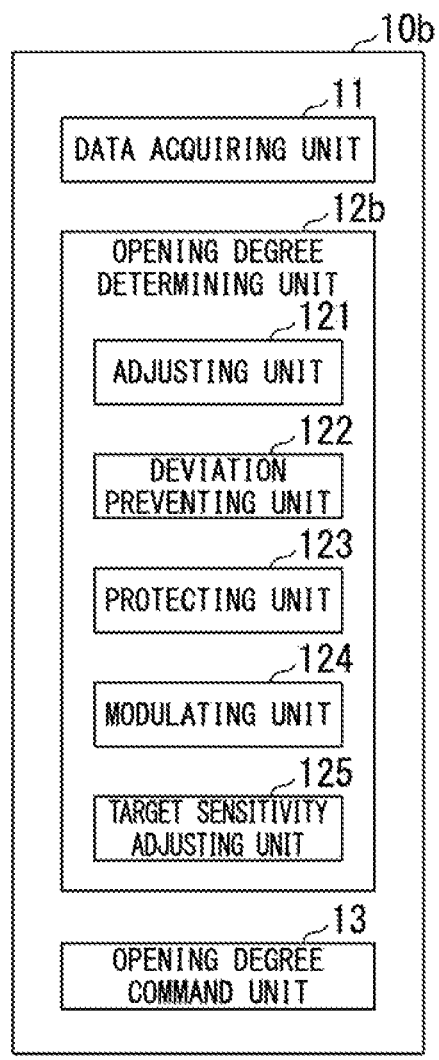
FIG. 7 is a diagram illustrating an example of a data table in which a sensitivity of a disk cavity is defined in a third embodiment of the present invention.
FIG. 8 is a functional block diagram illustrating an example of a control device according to a fourth embodiment of the present invention.

FIG. 7 is a diagram illustrating an example of a data table in which a sensitivity of a disk cavity is defined in the third embodiment of the present invention.

In the data table illustrated in FIG. 7, a target sensitivity Asv set in accordance with an operation state and an operation environment of a gas turbine 1 such as an output value and an atmospheric temperature is predetermined. As other examples of parameters indicating the operation state and the operation environment of the gas turbine 1, for example, an output change rate, an atmospheric humidity, an atmospheric pressure, a flow rate (a degree of opening of an IGV) of air suctioned into a compressor 2, a flow rate of a fuel to be supplied to a combustor 3, a temperature of the fuel, and the like may be included. Furthermore, a cumulative operation time of the gas turbine 1, the number of maintenances of the cooling air flow rate control valve 8 and a turbine 4, an elapsed time since the last maintenance and the like may be included in parameters in consideration of aging of the gas turbine 1, a disk cavity 43, a cooling air flow rate control valve 8, and the like and the target sensitivity Asv may be determined in accordance with values of the plurality of parameters.

The data acquiring unit 11 acquires measured values and the like associated with the above-described parameters in addition to a value of a DCT and an output value of the gas turbine 1. An adjusting unit 121 refers to the table illustrated in FIG. 7 to determine a value of the target sensitivity Asv as "X4," for example, if the output value of the gas turbine 1 is "W1" and the atmospheric temperature is "t1," and controls the sensitivity Amv (or Amvc) to approach Asv in accordance with the method in the first embodiment (or the second embodiment).

According to this embodiment, since the target sensitivity Asv according to the operation state and the operation environment of the gas turbine 1 can be set, it is possible to perform more realistic valve opening control. It is possible to perform robust control with respect to changes in the operation state and changes in the operation environment during an operation.

Fourth Embodiment

Valve opening degree control according to a fourth embodiment of the present invention will be described below with reference to FIG. 8.

FIG. 8 is a functional block diagram illustrating an example of a control device according to the fourth embodiment of the present invention.

As illustrated in FIG. 8, a control device 10b according to this embodiment includes a data acquiring unit 11, an opening degree determining unit 12b, and an opening degree command unit 13. The opening degree determining unit 12b includes an adjusting unit 121, a deviation preventing unit 122, a protecting unit 123, a modulating unit 124, and a target sensitivity adjusting unit 125.

When a sensitivity Amv (or Amvc) changes in a state in which control has been performed so that a sensitivity Amv is a target sensitivity Asv determined in advance, the target sensitivity-adjusting unit 125 adjusts a value of the target sensitivity Asv toward a safe side in consideration of the variation. That is to say, the target sensitivity-adjusting unit 125 reduces the value of Asv so that a flow rate G1 corresponding to Asv has a large value (on a safe side). To be specific, the target sensitivity-adjusting unit 125 acquires a maximum value of A*sv using the following Expression (4) and updates a value of a target sensitivity from a predetermined Asv to A*sv.

[Math. 4]

$$A'_{sv} = \underset{A_{SV} \in [A_{sv_{min}}, A_{sv_{max}}]}{\operatorname{argmax}} [A_{sv} - \alpha \cdot VAR(A_{sv} - A_{mv})] \quad (4)$$

Here, an adjustment coefficient α is a constant and VAR (Asv−Amv) is a variance of an error between Asv and Amv. An upper limit value $Asv_{max}$ and a lower limit $Asv_{min}$ are predetermined values and the target sensitivity adjusting unit 125 varies Asv within this range and retrieves Asv in which the right side of Expression (4) is maximized. Even if control is performed to make a value of Amv close to Asv, the value of Amv is rarely constant in the vicinity of Asv and actually varies. Particularly, the variation occurs in a direction in which a value of the flow rate G1 decreases (a left direction of the band α in the graph in FIG. 3), the value of my sharply rises at a point at which the variation is maximized and there is a risk that a temperature of a DCT of a disk cavity rises beyond an allowable range. Thus, when a large value is attempted to be set to Asv as large as possible to control the DCT to have an appropriate temperature at a minimum required flow rate G1, Asv is adjusted so that a flow rate G1 corresponding to Asv increases by an amount corresponding to the variation of Amv to prevent the risk as described above. For example, when a value of the target sensitivity Asv is "1.5" and a value of Amv varies in the range of "1.3" to "1.8," a value of Asv (for example, "1.8") is calculated from Expression (4) and this value is set as a new target sensitivity Asv. Thus, it is possible to minimize a risk that a DCT rises even if the value of Amv varies, for example, in the range of "1.5" to "2.1" with respect to the new Asv "1.8."

In this way, according to this embodiment, it is possible to set a value of the target sensitivity Asv in which the economizing of the cooling air flow rate and the risk of rising of the DCT are balanced. Thus, it is possible to realize the stability of control.

Fifth Embodiment

Valve opening degree control according to a fifth embodiment of the present invention will be described below with reference to FIGS. 9 to 12.

Figure 9:
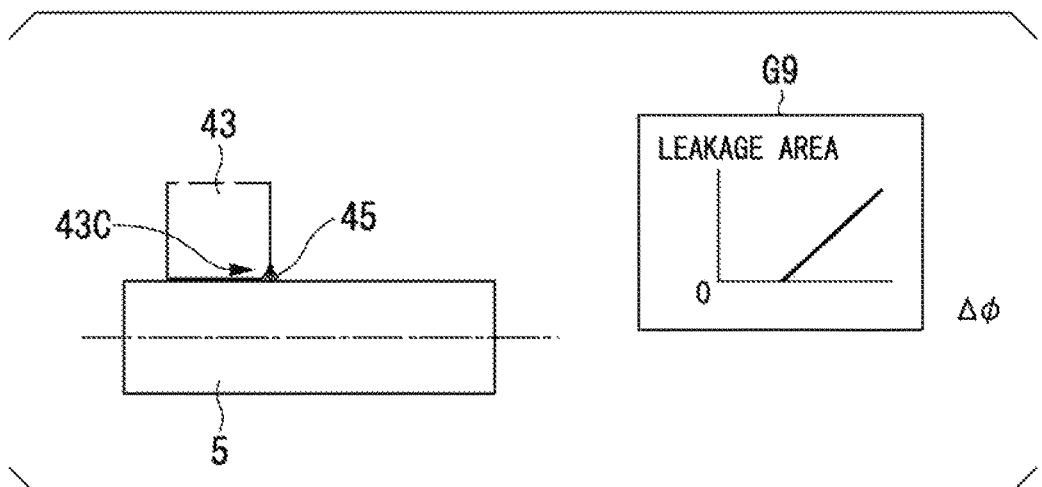
FIG. 9 is a diagram explaining leakage of cooling air from a disk cavity in a fifth embodiment of the present inventio.

FIG. 9 is a diagram explaining leakage of cooling air from a disk cavity in the fifth embodiment of the present invention.

As illustrated in FIG. 9, a brush seal 45 is provided in a portion of a disk cavity 43 corresponding to an opening portion 43C. When an operation of a gas turbine 1 starts, the brush seal 45 and the rotor 5 are in contact with each other. In this case, if a flow rate G1 of cooling air decreases, a DCT increases due to the backflow. Furthermore, when an operation of the gas turbine 1 starts, a combustion gas flows into a turbine 4 and the turbine 4 has a high temperature. For this reason, a phenomenon in which a disk cavity 43 thermally expands, an inner diameter of the brush seal 45 increases, and a gap ΔΦ between the brush seal 45 and the rotor 5 increases occurs. If the brush seal 45 is not worn, a value of a flow rate G3 is kept constant while a tip of the brush seal 45 is being in contact with the rotor 5 even if thermal expansion occurs. Incidentally, if the brush seal 45 wears after a lapse of time from the start of an operation of the gas turbine 1, a gap ΔΦ is defined between the tip of the brush seal 45 and the rotor 5 due to an increase in diameter of the disk cavity 43 due to thermal expansion. Thus, an area of an opening portion 43C (a leakage area of cooling air) increases and the flow rate G3 increases. This state is illustrated in a graph G9. If the flow rate G3 increases, a degree of increase in DCT with respect to a decrease in flow rate G1 of cooling air increases. In this way, in an actual operation of the gas turbine 1, a phenomenon in which the flow rate G3 which has been described as being constant increases to a certain value in accordance with an operation time and the wear of the brush seal 45 occurs. If the flow rate G3 increases, a DCT tends to increase. Thus, in the fifth embodiment, control corresponding to the increase in the flow rate G3 is added.

Figure 10:
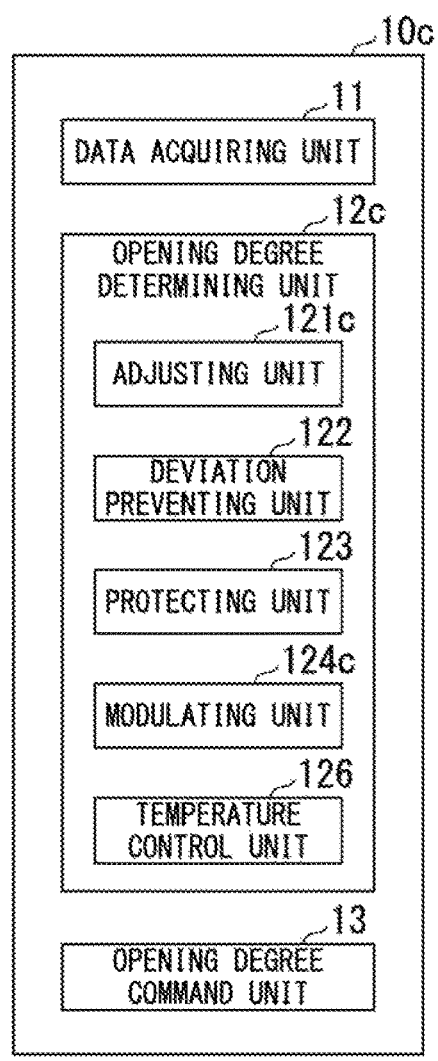
FIG. 10 is a functional block diagram illustrating an example of a control device according to a fifth embodiment of the present invention.

FIG. 10 is a functional block diagram illustrating an example of a control device according to the fifth embodiment of the present invention.

As illustrated in FIG. 10, a control device 10c according to this embodiment includes a data acquiring unit 11, an opening degree determining unit 12c, and an opening degree command unit 13. The opening degree determining unit 12c includes an adjusting unit 121c, a deviation preventing unit 122c, a protecting unit 123, and a modulating unit 124c.

Also in this embodiment, the opening degree determining unit 12c performs the control described in the first to fourth embodiments while the brush seal 45 and the rotor 5 are in contact with each other to control a flow rate of cooling air. That is to say, the adjusting unit 121c, the deviation preventing unit 122, the protecting unit 123, and the modulating unit 124c associated with this embodiment have the functions described with reference to FIG. 4. Control in which the adjusting unit 121c, the protecting unit 123, the modulating unit 124c, and a temperature control unit 126 are used after a gap ΔΦ has been generated between the brush seal 45 and the rotor 5 will be described below with reference to FIG. 11. A coefficient K3 is an adjustment coefficient for the amount of correction of the cooling air flow rate control valve 8. A coefficient K31 is an adjustment coefficient for the amount of correction of the cooling air flow rate control valve 8.

Figure 11:
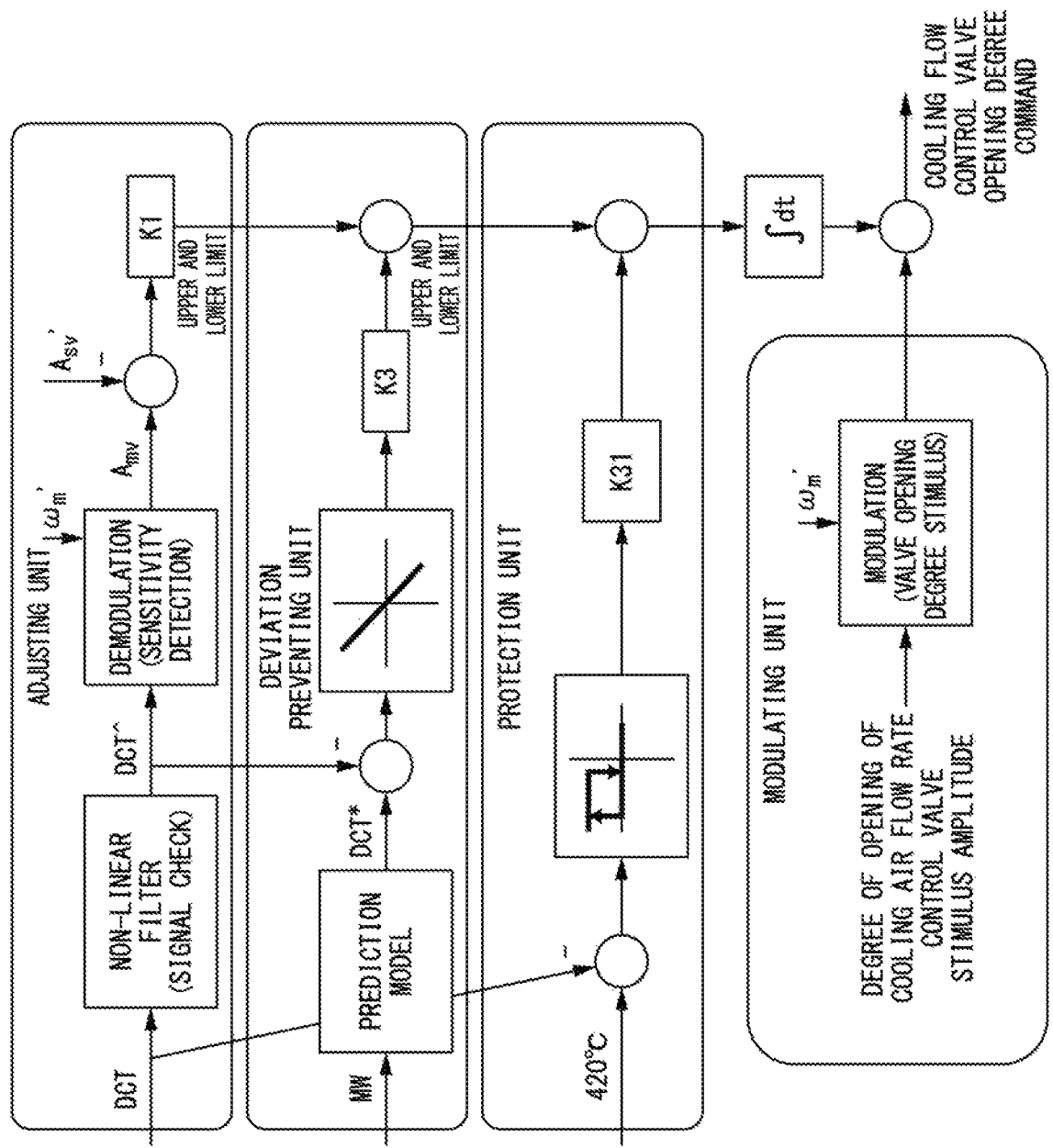
FIG. 11 is a diagram explaining a method for controlling a degree of opening of a valve according to the fifth embodiment of the present invention.

FIG. 11 is a diagram explaining a method for controlling a degree of opening of a valve according to the fifth embodiment of the present invention.

The modulating unit 124c instructs the opening degree command unit 13 to output an opening degree command in which a degree of opening of a cooling air flow rate control valve 8 is modulated by a sine wave having, for example, an amplitude of 0.5% and ωm' with a period of 20 minutes. The opening degree command unit 13 opens and closes the degree of opening of the cooling air flow rate control valve 8 by an amount corresponding to 0.5% in a period of 20 minutes in accordance with this instruction to vary the flow rate G1. Thus, the flow rate G1 and the DCT are varied. Moreover, the adjusting unit 121c monitors a sensitivity of the DCT and detects a target sensitivity Asv' set in the vicinity of a right end of a band α on the basis of the sensitivity of the DCT. Subsequently, the adjusting unit 121c calculates an amount of correction of the flow rate G1 of the cooling air on the basis of a deviation between a sensitivity Amv and the target sensitivity Asv'. For example, if Amv is smaller than Asv', the adjusting unit 121c corrects the cooling air flow rate control valve 8 in a direction in which the cooling air flow rate control valve 8 is closed. If Amv is larger than Asv', the adjusting unit 121c corrects the degree of opening of the cooling air flow rate control valve 8 to increase the degree thereof. These processes are the same as those of the first embodiment except that an amplitude and a period of the variation are different.

The temperature control unit 126 acquires an output value (MW) of the gas turbine 1 and calculates a target value of the DCT according to the output value using a prediction model or the like. Furthermore, the temperature control unit 126 calculates an amount of correction for adjusting the degree of opening of the cooling air flow rate control valve 8 so that a measured value of the DCT is the target value on the basis of a deviation between a temperature measured by the temperature sensor 44 and the target value of the DCT.

The protecting unit 123 monitors a temperature (a DCT) measured by the temperature sensor 44 and calculates an amount of correction in which the cooling air flow rate control valve 8 fully opens if the measured value of the DCT is higher than a predetermined threshold value (for example, 420° C.).

The opening degree-determining unit 12c integrates values of an amount of correction calculated by the adjusting unit 121c, the deviation-preventing unit 122, and the protecting unit 123 in accordance with the variation of the DCT changing over time, adds the integrated value to a modulation command value of a degree of opening using the modulating unit 124c, and determines the degree of opening of the cooling air flow rate control valve 8. The opening degree command unit 13 controls the degree of opening of the cooling air flow rate control valve 8 so that the degree of opening of the cooling air flow rate control valve 8 has a value determined by the opening degree determining unit 12c. The opening degree determining unit 12c performs feedback-controlling once every 20 minutes so that Amv is equal to Asv' on the basis of the DCT acquired by the data acquiring unit 11 and the output value of the gas turbine 1. In parallel with this, the opening degree determining unit 12c (the temperature control unit 126) performs feedback-controlling based on a temperature so that the measured value of the DCT is equal to the target value. With such control, even in a situation in which a gap between the brush seal 45 and the rotor 5 changes, the flow rate G1 of the cooling air is adjusted in accordance with this situation and the effect of economizing the flow rate G1 can be obtained while the DCT is maintained at an appropriate temperature.

Figure 12:
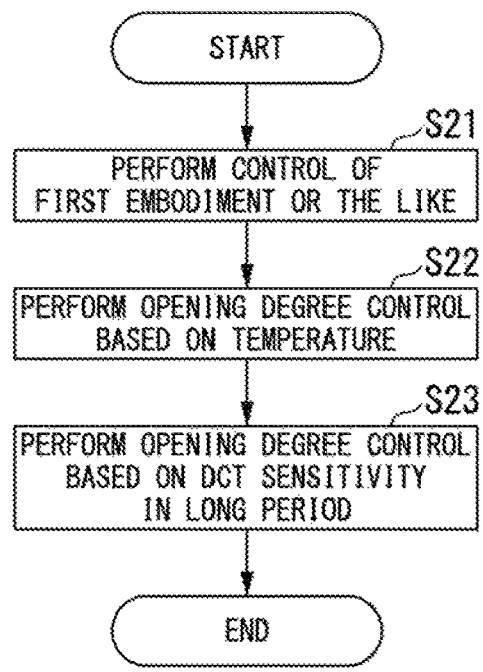
FIG. 12 is a flowchart describing an example of the method for controlling a degree of opening of a valve according to the fifth embodiment of the present invention.

FIG. 12 is a flowchart describing an example of the method for controlling a degree of opening of a valve according to the fifth embodiment of the present invention.

First, at the same time as an operation of the gas turbine 1 starts, the degree of opening of the cooling air flow rate control valve 8 is controlled so that the sensitivity Amv of the DCT is Asv using the method described in the first to fourth embodiments (Step S21). If control is possible so that Amv is Asv, then the temperature control unit 126 controls the degree of opening of the cooling air flow rate control valve 8 on the basis of a temperature (Step S22). To be specific, as described with reference to FIG. 11, the temperature control unit 126 adjusts the degree of opening of the cooling air flow rate control valve 8 to perform feedback-controlling so that the DCT is the target temperature.

Subsequently, the adjusting unit 121c, the modulating unit 124c, or the like performs opening degree control based on the sensitivity of the DCT in a long period (for example, 20 minutes) (Step S23). To be specific, as described with reference to FIG. 11, the modulating unit 124c stimulates the degree of opening of the cooling air flow rate control valve 8 in a period of 20 minutes and the adjusting unit 121c calculates Amv for a center of the varied degree of opening from the measured value (waveform data) of the DCT with respect to the stimulus. Furthermore, the adjusting unit 121c calculates an amount of correction based on a deviation between the calculated Amv and a predetermined target sensitivity Asv'. Thus, in this embodiment, the influence with respect to the DCT of an increase in the flow rate G3 caused by the expansion of the gap between the brush seal 45 and the rotor 5 due to thermal expansion is handled.

If the value of the sensitivity Amv increases during the control in Step S23, this indicates that the gap has expanded. Although a predetermined target sensitivity Asv' is a sensitivity at the flow rate G1 smaller than the flow rate at the right end of the band α by a predetermined value, the predetermined target sensitivity Asv' may be different from the target sensitivity Asv in the first to fourth embodiments. At the start of an operation, an outer circumference of the rotor 5 is in contact with the brush seal 45. In addition, as the temperature inside the turbine 4 after the start of the operation increases, a gap between the rotor 5 and the brush seal 45 is formed, but a size of the gap is not uniform over the entire circumference of the rotor 5. The target sensitivity Asv' in this embodiment is, for example, a value of a sensitivity in an ideal operation state in a state in which a length of an arc at which the tip of the brush seal 45 is away from the rotor 5 is half a length of the entire circumference. The opening degree control based on the target sensitivity Asv' in a period of 20 minutes is performed because it takes about 20 minutes from a change of the degree of opening to a time at which the change of the DCT has been performed on the entire disk cavity 43 due to the influence of the change. Furthermore, in this embodiment, while the control based on the target sensitivity Asv' is performed in a period of 20 minutes, the temperature control unit 126 continues the control based on the temperature of the disk cavity 43. Thus, control responsiveness can be maintained.

In this way, according to this embodiment, it is possible to prevent the DCT from rising even when the flow rate G3 has increased due to deformation caused by thermal expansion of the disk cavity 43.

(Hardware Constitution)

Figure 13:
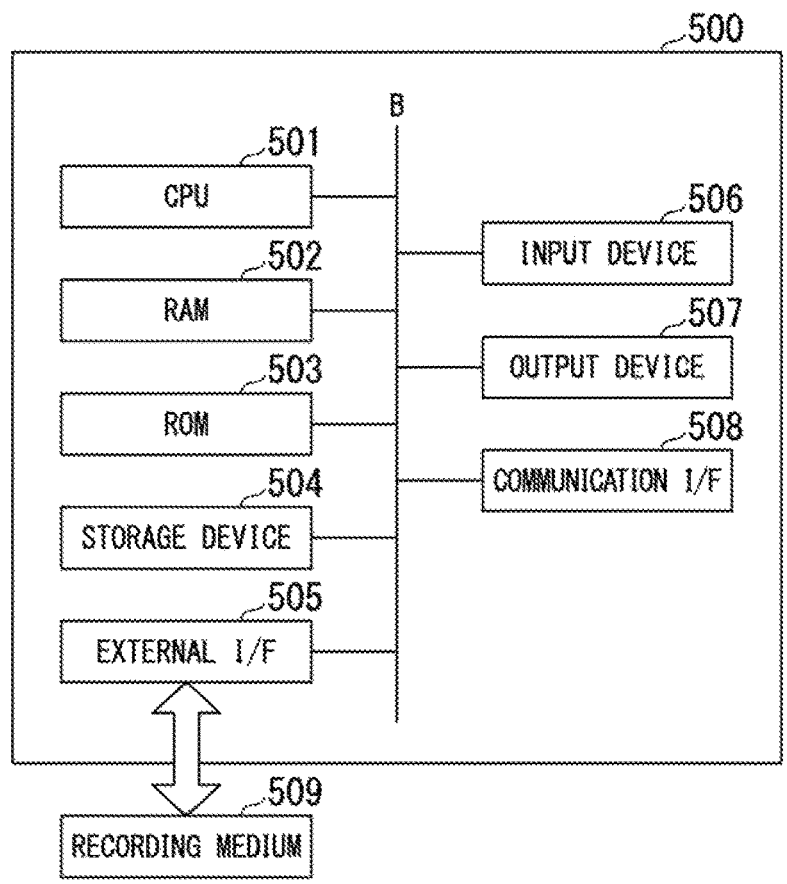
FIG. 13 is a diagram illustrating an example of a hardware constitution of a control device according to the present invention.

FIG. 13 is a diagram illustrating an example of a hardware constitution of a control device according to the present invention.

A computer 500 includes a central processing unit (CPU) 501, a random-access memory (RAM) 502, a read-only memory (ROM) 503, a storage device 504, an external interface (I/F) 505, an input device 506, an output device 507, a communication I/F 508, and the like. These devices transmit and receive signals to/from each other via a bus B.

The CPU 501 is an arithmetic unit configured to realize each function of the computer 500 by reading out a program and data stored in the ROM 503, the storage device 504, and the like on the RAM 502 and executing a process concerning the program and data. For example, each of the functional units described above is a function provided in the computer 500 to be executed when the CPU 501 reads out and executes a program stored in the ROM 503 or the like. The RAM 502 is a volatile memory used as a work area or the like of the CPU 501. The ROM 503 is a non-volatile memory in which a program and data are retained even when electric power is turned off. The storage device 504 is realized using, for example, a hard disk drive (HDD), a solid-state drive (SSD), or the like and stores an operation system (OS), application programs, various data, and the like. The external I/F 505 is an interface with respect to external devices. Examples of the external devices include a recording medium 509 and the like. The computer 500 can perform reading and writing with respect to the recording medium 509 via the external I/F 505. Examples of the recording medium 509 include an optical disk, a magnetic disk, a memory card, a universal serial bus (USB) memory, and the like.

The input device 506 includes, for example, a mouse, a keyboard, and the like and receives an operator's instruction to input various operations to the computer 500. The output device 507 is realized using, for example, a liquid crystal display and displays a processing result using the CPU 501. The communication I/F 508 is an interface configured to connect the computer 500 to a network such as the Internet using wired or wireless communication. The bus B is connected to each of the above constituent devices and transmits and receives various signals between the constituent devices.

A process of each of the processes in the control device 10 described above is stored in a computer-readable recording medium in the form of a program and the above processes are performed when a computer of the control device 10 reads out and executes the program. Here, the computer-readable recording medium is a magnetic disk, a magneto-optical disk, a CD-ROM, a DVD-ROM, a semiconductor memory, or the like. The computer program may be distributed to a computer via a computer line and the computer which has received the computer program may execute the program.

The program may be for realizing some of the functions described above. Furthermore, a program in which the above-described functions can be realized in combination with a program recorded in a computer system in advance, a so-called difference file (a difference program), may be adopted.

The control device 10 may be constituted using one computer or may be constituted of a plurality of computers communicably connected.

In addition, it is possible to appropriately replace the constituent elements in the above-described embodiments with known constituent elements without departing from the gist of the present invention. The technical scope of the present invention is not limited to the above-described embodiments and various modifications can be provided without departing from the gist of the present invention. The gas turbine 1 and the turbine 4 are examples of a rotating machine, the rotor 5 is an example of a rotating shaft, and the disk cavity 43 is an example of a shaft seal portion.

INDUSTRIAL APPLICABILITY

According to the control device, the gas turbine, the control method, and the program described above, it is possible to maintain a temperature of a disk cavity at an appropriate temperature while economizing on a flow rate of cooling air supplied into the disk cavity.

REFERENCE SIGNS LIST

1 Gas turbine
2 Compressor
3 Combustor
4 Turbine
5 Rotor
6A, 6B Bearing
7 Extraction pipe
8 Cooling air flow rate control valve
81 Opening degree meter
9 Electric power generator
10 Control device
11 Data acquiring unit
12, 12a, 12b, 12c Opening degree determining unit
121, 121a, 121c Adjusting unit
122, 122c Deviation preventing unit
123 Protecting unit
124, 124a, 124c Modulating unit
125 Target sensitivity adjusting unit
126 Temperature control unit
13 Opening degree command unit
40 Casing
41 Turbine vane
42 Turbine blade
43 Disk cavity
43A, 43B, 43C Opening portion
44 Temperature sensor
45 Brush seal
G1, G2, G3 Flow rate
Asv, Asv' Target sensitivity
Amv, Amvc Sensitivity

The invention claimed is:

1. A control device configured to control a temperature of a shaft seal portion provided around a rotating shaft of a rotating machine, wherein a flow rate of cooling air is controlled so that a sensitivity indicated by a temperature of the shaft seal portion with respect to the flow rate of the cooling air supplied to the shaft seal portion is to be a predetermined target value.

2. The control device according to claim 1, wherein the predetermined target value is a value of the sensitivity with respect to the flow rate of the cooling air in which the temperature of the shaft seal portion is within an allowable range among sensitivities of a flow rate of the cooling air with respect to the flow rate of the cooling air in a predetermined range from a boundary between a flow rate of the cooling air at which an absolute value of the sensitivity is larger than 0 and a flow rate of the cooling air at which the absolute value of the sensitivity is 0.

3. The control device according to claim 2, wherein the predetermined target value is a value of the sensitivity at a flow rate of the cooling air smaller by a predetermined value than the flow rate of the cooling air at a boundary at which the absolute value of the sensitivity changes from a value larger than 0 to 0 with an increase in the flow rate of the cooling air.

4. The control device according to claim 2, wherein the control device is configured to control the flow rate of the cooling air so that the sensitivity approaches the predetermined target value from a flow rate of the cooling air larger than the flow rate of the cooling air at the boundary to a smaller flow rate of the cooling air.

5. The control device according to claim 1, wherein the control device is configured to:
control a degree of opening of a flow rate control valve provided in a path through which the cooling air is supplied to the shaft seal portion to control the flow rate of the cooling air; and
at a time of controlling the degree of opening of the flow rate control valve, vary an opening degree command value to the flow rate control valve in a predetermined range, calculate the sensitivity with respect to the flow rate of the cooling air at a degree of opening representing the opening degree command value which has been varied based on variation of the temperature of the shaft seal portion, and correct the opening degree command value based on a deviation between the sensitivity and the predetermined target value.

6. The control device according to claim 5, wherein, when the sensitivity is calculated, the control device is configured to calculate the sensitivity with respect to the flow rate of the cooling air based on the opening degree command value and correct the sensitivity based on a gap between the opening degree command value and an actual flow rate of the cooling air based on the opening degree command value.

7. The control device according to claim 5, wherein, in a case in which the sensitivity varies in a state in which the deviation between the sensitivity and the predetermined target value is controlled such that the predetermined target value is within a predetermined allowable range, when the temperature of the shaft seal portion when the flow rate of the cooling air is small in the variation exceeds a predetermined allowable range, the control device is configured to reduce the predetermined target value so that the temperature of the shaft seal portion does not exceed a predetermined threshold value even if variation in the sensitivity occurs.

8. The control device according to claim 1, wherein a different value is set as the predetermined target value in accordance with an operation state or an operation environment of the rotating machine.

9. The control device according to claim 1, wherein, when the flow rate of the cooling air flowing out of the shaft seal portion changes due to deformation due to thermal expansion of the shaft seal portion, the control device is configured to control the flow rate of the cooling air so that the sensitivity is the predetermined target value set for the deformation.

10. The control device according to claim 1, wherein the rotating machine is a gas turbine and the shaft seal portion is a disk cavity of a turbine included in the gas turbine.

11. A gas turbine, comprising:
the control device according to claim 1,
wherein the rotating machine is the gas turbine and the shaft seal portion is a disk cavity of a turbine included in the gas turbine.

12. A method for controlling a temperature of a shaft seal portion provided around a rotating shaft of a rotating machine, wherein a flow rate of cooling air supplied to the shaft seal portion is controlled so that a sensitivity indicated by a temperature of the shaft seal portion with respect to the flow rate of the cooling air supplied to the shaft seal portion is to be a predetermined target value.

13. A non-transitory computer-readable medium storing a program causing a computer to function as:
a means for determining a flow rate of cooling air supplied to a shaft seal portion provided around a rotating shaft of a rotating machine so that a sensitivity indicated by a temperature of the shaft seal portion with respect to the flow rate of the cooling air supplied to the shaft seal portion is to be a predetermined target value.

* * * * *